United States Patent [19]
Howard et al.

[11] Patent Number: 5,701,763
[45] Date of Patent: Dec. 30, 1997

[54] CRYOGENIC HYBRID SYSTEM FOR PRODUCING LOW PURITY OXYGEN AND HIGH PURITY NITROGEN

[75] Inventors: Henry Edward Howard; Dante Patrick Bonaquist, both of Grand Island, N.Y.

[73] Assignee: Praxair Technology, Inc., Danbury, Conn.

[21] Appl. No.: 778,075

[22] Filed: Jan. 7, 1997

[51] Int. Cl.$^6$ .................................................. F25J 1/00
[52] U.S. Cl. ........................... 62/644; 62/908; 95/41; 96/126
[58] Field of Search ...................... 62/643, 642, 908, 62/644; 95/41; 96/126

[56] References Cited

U.S. PATENT DOCUMENTS

| | | | |
|---|---|---|---|
| 4,732,580 | 3/1988 | Jain et al. | 55/26 |
| 4,861,361 | 8/1989 | Jain et al. | 62/18 |
| 4,957,523 | 9/1990 | Zarate et al. | 62/908 |
| 5,090,973 | 2/1992 | Jain | 55/26 |
| 5,421,163 | 6/1995 | Engler et al. | 62/18 |
| 5,463,869 | 11/1995 | Kumar et al. | 62/24 |
| 5,470,543 | 11/1995 | Nagamura et al. | 422/211 |
| 5,486,227 | 1/1996 | Kumar et al. | 95/41 |

*Primary Examiner*—Ronald C. Capossela
*Attorney, Agent, or Firm*—Stanley Ktorides

[57] ABSTRACT

A hybrid system for producing both low purity oxygen and high purity nitrogen at high product recovery rates wherein desorption effluent from an adsorbent system feeds a cryogenic rectification column and, preferably, bottom fluid from the column provides additional feed for the adsorbent system.

10 Claims, 1 Drawing Sheet

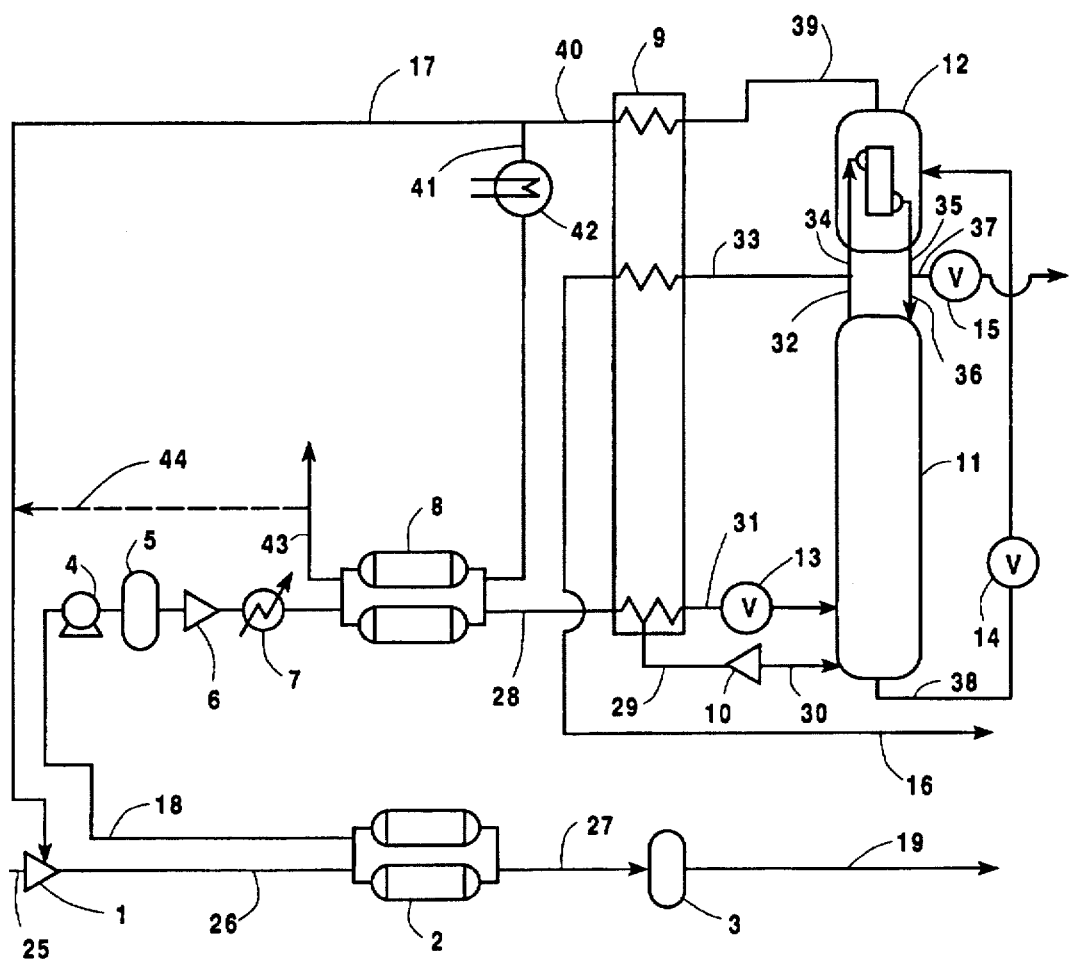

1

CRYOGENIC HYBRID SYSTEM FOR PRODUCING LOW PURITY OXYGEN AND HIGH PURITY NITROGEN

TECHNICAL FIELD

This invention relates generally to the separation of air and, more particularly, to the separation of feed air to produce low purity oxygen and high purity nitrogen.

BACKGROUND ART

In some industrial applications it is desirable to use both low purity oxygen and high purity nitrogen. For example, in glassmaking, low purity oxygen is employed in oxy-fuel combustion to heat and melt the glassmaking materials while high purity nitrogen is used as an inerting atmosphere for the molten glass. Generally, in such situations, the nitrogen to oxygen product flow requirements are of the order of a ratio of 1.5 to 2.0.

High purity nitrogen and low purity oxygen can be effectively produced by the cryogenic rectification of air but not with high product recovery in the desirable ratio range without expensive process modifications.

Accordingly, it is an object of this invention to provide a cryogenic rectification system that can efficiently produce both low purity oxygen and high purity nitrogen.

It is another object of this invention to provide a cryogenic rectification system that can efficiently produce both low purity oxygen and high purity nitrogen at high product recovery for both products.

SUMMARY OF THE INVENTION

The above and other objects, which will become apparent to one skilled in the art upon a reading of this disclosure, are attained by the present invention, one aspect of which is:

A method for producing low purity oxygen and high purity nitrogen comprising:
   (A) passing feed air into an adsorbent system comprising at least one adsorbent bed and adsorbing nitrogen from the feed air within the adsorbent system to produce oxygen-enriched vapor and nitrogen-enriched vapor;
   (B) recovering oxygen-enriched vapor as product low purity oxygen;
   (C) passing nitrogen-enriched vapor into a column and separating the nitrogen-enriched vapor by cryogenic rectification within the column into nitrogen top fluid and oxygen-containing bottom fluid; and
   (D) recovering nitrogen top fluid as product high purity nitrogen.

Another aspect of the invention is:

Apparatus for producing low purity oxygen and high purity nitrogen comprising:
   (A) an adsorbent system comprising at least one adsorbent bed and having feed input means whereby feed air is passed into the adsorbent system;
   (B) means for recovering low purity oxygen from the adsorbent system;
   (C) means for passing nitrogen-enriched vapor from the adsorbent system into a cryogenic rectification column; and
   (D) means for recovering fluid from the upper portion of the cryogenic rectification column as product high purity nitrogen.

As used herein, the term "feed air" means a mixture comprising primarily oxygen and nitrogen, such as ambient air.

As used herein, the term "low purity oxygen" means a fluid having an oxygen concentration with the range of from 50 to 98.5 mole percent.

As used herein, the term "high purity nitrogen" means a fluid having an nitrogen concentration greater than 98.5 mole percent.

As used herein, the term "column" means a distillation or fractionation column or zone, i.e. a contacting column or zone, wherein liquid and vapor phases are countercurrently contacted to effect separation of a fluid mixture, as for example, by contacting of the vapor and liquid phases on a series of vertically spaced trays or plates mounted within the column and/or on packing elements such as structured or random packing. For a further discussion of distillation columns, see the Chemical Engineer's Handbook, fifth edition, edited by R. H. Perry and C. H. Chilton, McGraw-Hill Book Company, New York, Section 13, *The Continuous Distillation Process*.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling component will tend to concentrate in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases is generally adiabatic and can include integral (stagewise) or differential (continuous) contact between the phases. Separation process arrangements that utilize the principles of rectification to separate mixtures are often interchangeable termed rectification columns, distillation columns, or fractionation columns. Cryogenic rectification is a rectification process carried out at least in part at temperatures at or below 150 degrees Kelvin (K).

As used herein, the term "indirect heat exchange" means the bringing of two fluid streams into heat exchange relation without any physical contact or intermixing of the fluids with each other.

As used herein, the term "top condenser" means a heat exchange device which generates column downflow liquid from column vapor.

As used herein, the terms "turboexpansion and "turboexpander" mean respectively method and apparatus for the flow of high pressure gas through a turbine to reduce the pressure and the temperature of the gas thereby generating refrigeration.

As used herein, the terms "upper portion" and "lower portion" means those sections of a column respectively above and below the mid point of the column.

As used herein, the term "adsorbent" means a material (typically a solid) that can accept or capture a gas or liquid species within its interstices or pores. Examples of adsorbents include alumina, silica, carbon and molecular sieves. A particularly preferred adsorbent for use in this invention is nitrogen selective molecular sieve.

As used herein, the term "adsorbent bed" means a collection of adsorbent particles in proximity to each and configured such that it is able to be contacted by a fluid.

BRIEF DESCRIPTION OF THE DRAWING

The sole FIGURE is a schematic representation of one preferred embodiment of the cryogenic hybrid feed air separation system of this invention.

DETAILED DESCRIPTION

The invention enables the efficient production of high purity nitrogen and low purity oxygen with high product recovery for both products, especially with a product ratio of nitrogen to oxygen in the range of from 1.5 to 2.0. The invention employs an adsorption system and a cryogenic rectification system. Preferably, bottom fluid from the cryogenic rectification column is recycled to the adsorption system and undergoes separation in the adsorption system.

The invention will be described in greater detail with reference to the Drawing. Referring now to the FIGURE, feed air 25 is compressed to a pressure generally within the range of from 10 to 100 pounds per square inch absolute (psia) by passage through compressor 1 and resulting feed air stream 26 is passed into an adsorbent system 2 which comprises at least one adsorbent bed. Adsorbent system 2 illustrated in the FIGURE comprises two adsorbent beds and, in operation, stream 26 is cycled from one bed to the other as the adsorbent in one bed becomes loaded. Adsorption is carried out in one bed while desorption is carried out in the other bed and the flows are reversed when the adsorbing bed becomes loaded. The piping and valving typically associated with a multiple bed adsorbent system is not illustrated in the FIGURE. Those skilled in the art are familiar with multiple bed adsorption systems and their operation.

Within the adsorbent system nitrogen of feed air stream 26 is preferentially adsorbed onto the adsorbent particles comprising the adsorbent bed resulting in the production of oxygen-enriched vapor. The oxygen-enriched vapor, having an oxygen concentration preferably within the range of from 80 to 95 mole percent, is withdrawn from adsorbent system 2 in stream 27, passed into surge tank 3 and from there recovered as product low purity oxygen in stream 19.

When a bed of adsorbent system 2 becomes fully loaded with nitrogen it is desorbed, such as by exposing the bed to vacuum conditions by means of vacuum pump 4. The adsorbent system may desorb directly to ambient pressure without the need for a vacuum pump. The desorption causes nitrogen, which has been adsorbed onto the adsorbent particles, to form nitrogen-enriched vapor which is withdrawn from the adsorbent system in stream 18.

Nitrogen-enriched stream 18, having a nitrogen concentration generally within the range of from 85 to 95 mole percent, is passed through vacuum pump 4 and into surge tank 5. From surge tank 5 the nitrogen-enriched stream is compressed by passage through compressor 6 to a pressure generally within the range of from 50 to 200 psia and then cooled of the heat of compression by passage through cooler 7. Thereafter the nitrogen-enriched vapor stream is passed through high boiling adsorbent system 8 which, in the embodiment illustrated in the FIGURE, is a two bed system similar to that of nitrogen adsorbent system 2. By passage through adsorbent system 8, the nitrogen-enriched vapor is cleaned of high boiling impurities such as carbon dioxide, water vapor and hydrocarbons.

Cleaned, compressed nitrogen-enriched vapor 28 is passed into main heat exchanger 9 wherein it is cooled by indirect heat exchange with return streams. A first portion 29 of nitrogen-enriched vapor stream 28 is withdrawn after partial traverse of heat exchanger 9 and turboexpanded by passage through turboexpander 10 to generate refrigeration. Resulting turboexpanded stream 30 is passed into column 11. A second portion 31 of nitrogen-enriched vapor stream 28 completely traverses main heat exchanger 9, and is throttled through valve 13 and into column 11.

Column 11 is operating at a pressure generally within the range of from 30 to 180 psia. Within column 11 the nitrogen-enriched vapor is separated by cryogenic rectification into nitrogen top fluid and oxygen-containing bottom fluid. Nitrogen top fluid is passed out of the upper portion of column 11 as vapor stream 32. A portion 33 of nitrogen vapor stream 32 is warmed by passage through main heat exchanger 9 and resulting stream 16 is recovered as product high purity nitrogen. If desired, stream 33 may be turboexpanded to generate refrigeration prior to being passed into heat exchanger 9. Another portion 34 of nitrogen vapor stream 32 is passed into top condenser 12 wherein it is condensed by indirect heat exchange with oxygen-containing bottom fluid. Resulting nitrogen liquid is withdrawn from top condenser 12 in stream 35. At least a portion 36 of stream 35 is passed into column 11 as reflux. If desired a portion 37 of the nitrogen fluid from top condenser 12 may be passed through valve 15 and recovered as product high purity nitrogen liquid.

Oxygen-containing bottom fluid is withdrawn from the lower portion of column 11 in stream 38, throttled through valve 14 and passed into top condenser 12 wherein it is vaporized to carry out the previously described condensation of the nitrogen top fluid. If desired, stream 38 may be subcooled by indirect heat exchange with streams 33 and/or 39 prior to being passed into top condenser 12. Resulting oxygen-containing vapor is withdrawn from top condenser 12 in stream 39 and warmed by passage through heat exchanger 9 to form oxygen-containing bottom fluid stream 40 which may be removed from the system. If desired, stream 39 may be turboexpanded to generate refrigeration prior to being passed into heat exchanger 9.

The FIGURE illustrates a preferred embodiment of the invention wherein some or all of the oxygen-containing bottom fluid is recycled through the system. Because of the characteristics of the feed into column 11 and the operation of the column, the oxygen-containing bottom fluid has an oxygen concentration comparable to that of air, generally within the range of from 15 to 25 mole percent and typically about 21 mole percent. This enables oxygen-containing stream 40 to be fed into adsorbent system 2 for separation to produce oxygen-enriched vapor and nitrogen-enriched vapor.

Referring back to the FIGURE, oxygen-containing bottom fluid stream 40 may be divided into stream 17 and into stream 41. Stream 41 is warmed by passage through heat exchanger 42 and is used to clean or desorb high boiling adsorbent system 8. Alternatively a portion of nitrogen stream 33 may be used to clean or desorb high boiling adsorbent system 8. Resulting stream 43 is passed out of the system. If desired, if the oxygen- containing bottom fluid contains a higher concentration of oxygen than that of air, some of stream 43 may be recombined with stream 17 as shown by broken line 44.

In the embodiment illustrated in the FIGURE, stream 17 is passed into compressor 1 wherein it is combined with feed air 25 to form stream 26 which is passed into adsorbent system 2 and processed as previously described.

Although the invention has been described in detail with reference to certain preferred embodiments, those skilled in the art will recognize that there are other embodiments of the invention within the spirit and the scope of the claims.

We claim:

1. A method for producing low purity oxygen and high purity nitrogen comprising:

(A) passing feed air into an adsorbent system comprising at least one adsorbent bed and adsorbing nitrogen from the feed air within the adsorbent system to produce oxygen-enriched vapor and nitrogen-enriched vapor;

(B) recovering oxygen-enriched vapor as product low purity oxygen;

(C) passing nitrogen-enriched vapor into a column and separating the nitrogen-enriched vapor by cryogenic rectification within the column into nitrogen top fluid and oxygen-containing bottom fluid; and (D) recovering nitrogen top fluid as product high purity nitrogen.

2. The method of claim 1 further comprising passing oxygen-containing bottom fluid into the adsorbent system for further production of oxygen-enriched vapor and nitrogen-enriched vapor.

3. The method of claim 1 wherein the nitrogen-enriched vapor is compressed prior to being passed into the column.

4. The method of claim 1 wherein the nitrogen-enriched vapor is cleaned of high boiling impurities prior to being passed into the column.

5. The method claim 1 wherein the nitrogen-enriched vapor is cooled and at least a portion of the nitrogen-enriched vapor is turboexpanded prior to being passed into the column.

6. Apparatus for producing low purity oxygen and high purity nitrogen comprising:

(A) an adsorbent system comprising at least one adsorbent bed and having feed input means whereby feed air is passed into the adsorbent system;

(B) means for recovering low purity oxygen from the adsorbent system;

(C) means for passing nitrogen-enriched vapor from the adsorbent system into a cryogenic rectification column; and (D) means for recovering fluid from the upper portion of the cryogenic rectification column as product high purity nitrogen.

7. The apparatus of claim 6 further comprising means for passing fluid from the lower portion of the column into the feed input means of the adsorbent system.

8. The apparatus of claim 6 wherein the means for passing nitrogen-enriched vapor from the adsorbent system into the cryogenic rectification column comprises a compressor.

9. The apparatus of claim 6 wherein the means for passing nitrogen-enriched vapor from the adsorbent system into the cryogenic rectification column comprises a second adsorbent system for removing high boiling impurities from the nitrogen-enriched vapor.

10. The apparatus of claim 6 wherein the means for passing nitrogen-enriched vapor from the adsorbent system into the cryogenic rectification column comprises a turboexpanded.

* * * * *

UNITED STATES PATENT AND TRADEMARK OFFICE
CERTIFICATE OF CORRECTION

PATENT NO. : 5,701,763
DATED : December 30, 1997
INVENTOR(S) : H. E. Howard et al.

It is certified that error appears in the above-identified patent and that said Letters Patent is hereby corrected as shown below:

Column 6,

In claim 10, lines 3 and 4 delete "turboexpanded" and insert therefor --turboexpander--.

Signed and Sealed this

Twenty-fourth Day of February, 1998

*Attest:*

BRUCE LEHMAN

*Attesting Officer*  *Commissioner of Patents and Trademarks*